Dec. 4, 1956  O. M. FOX  2,772,665
WATER COOLED FURNACE STRUCTURES
Filed March 19, 1949  3 Sheets-Sheet 3
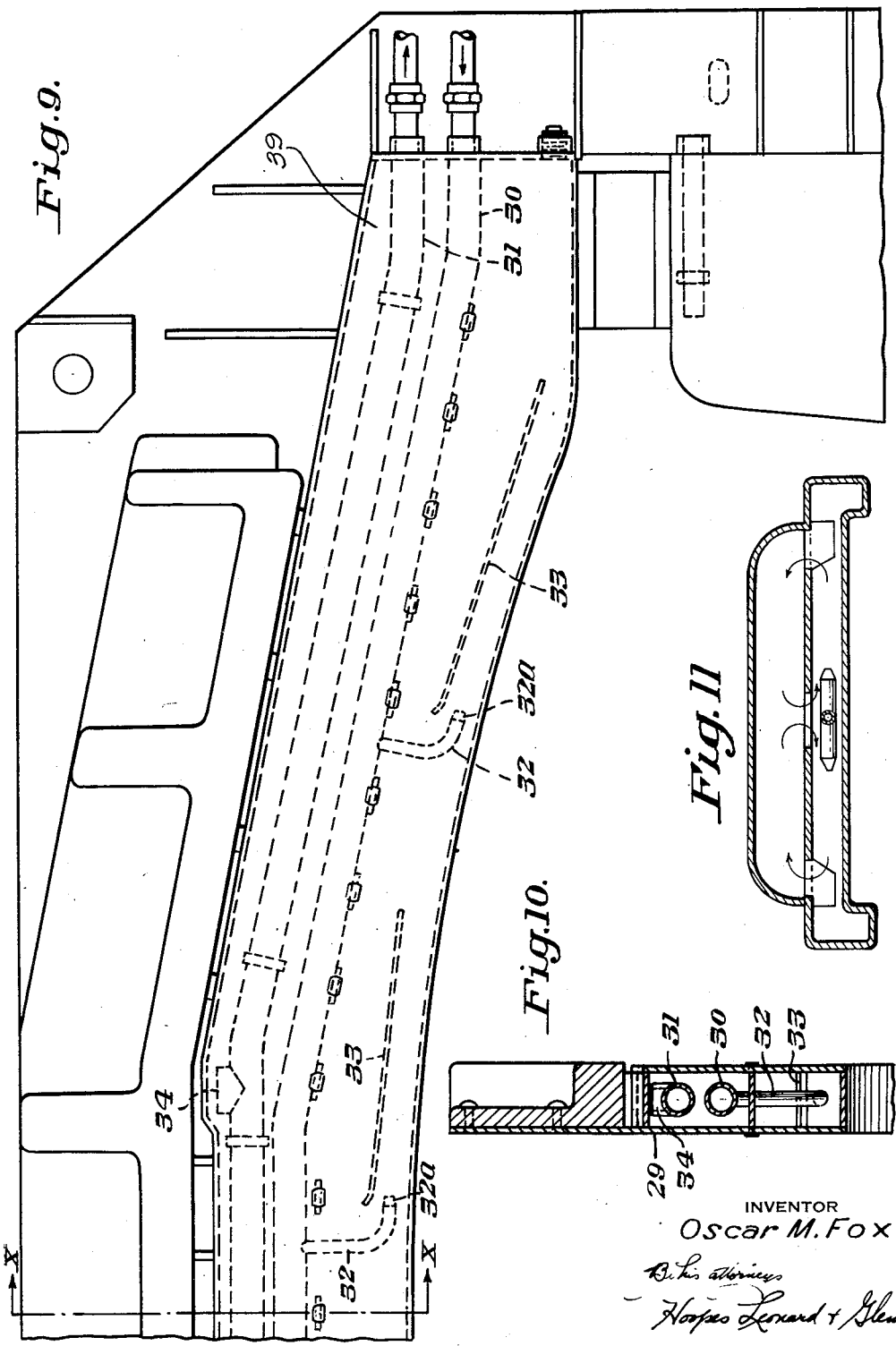
INVENTOR
Oscar M. Fox

United States Patent Office

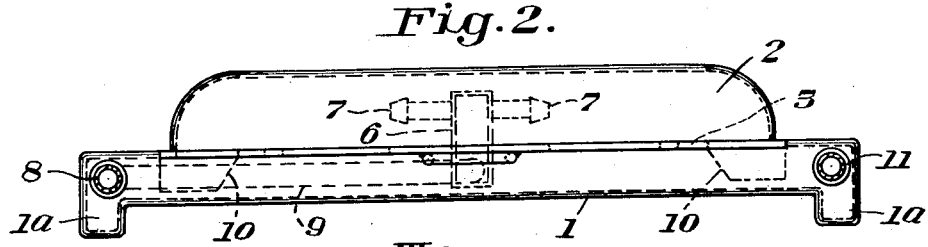
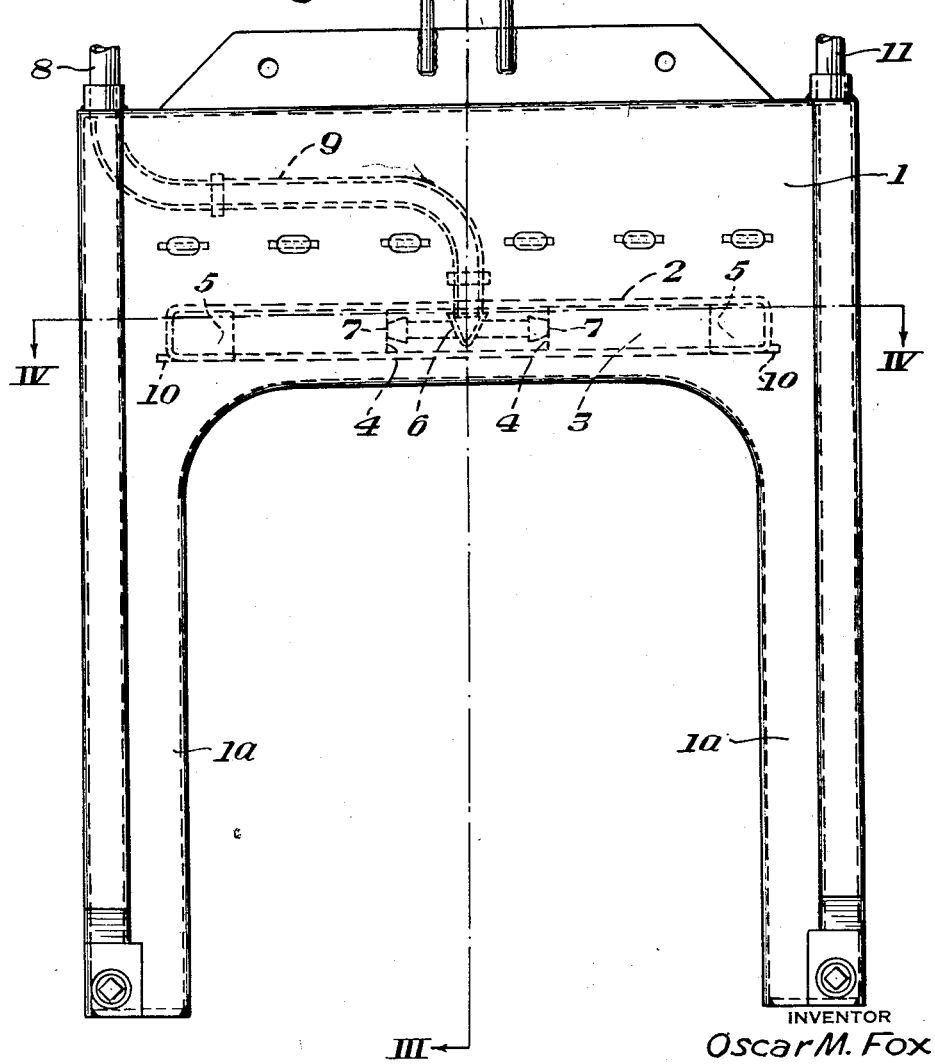

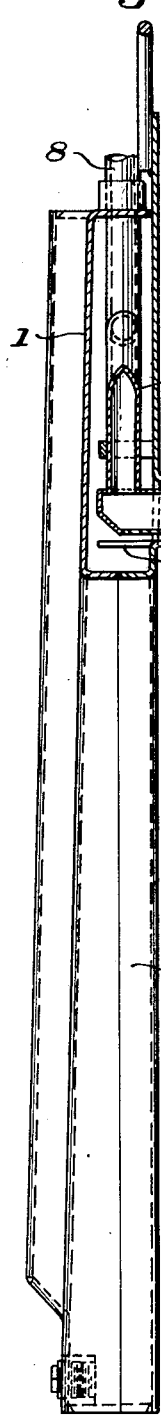
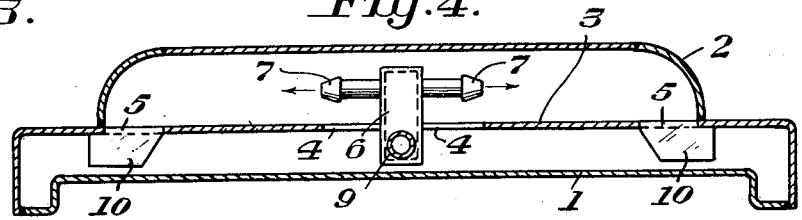
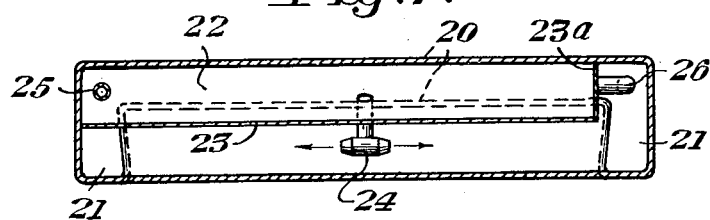
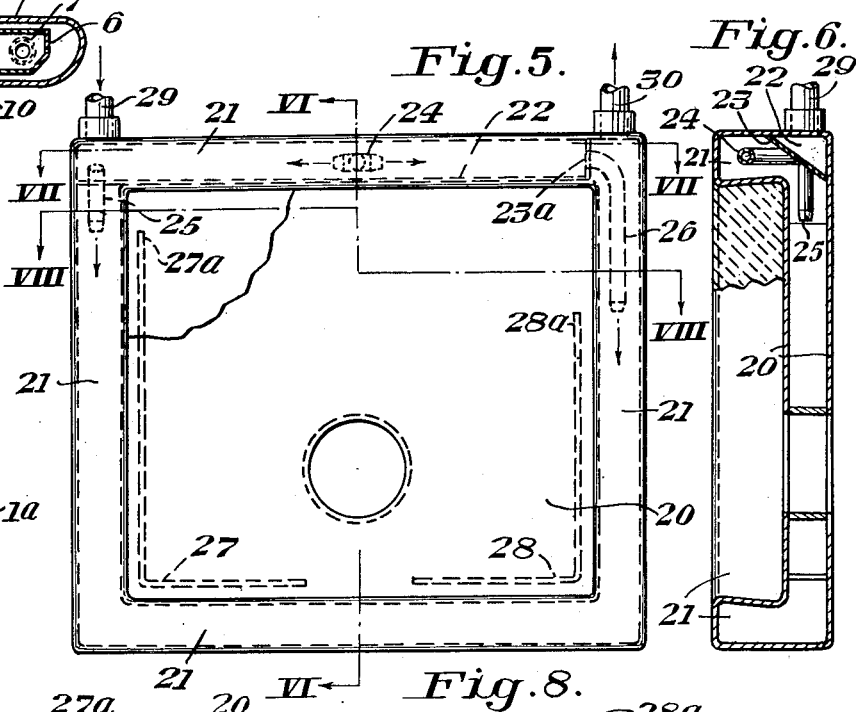
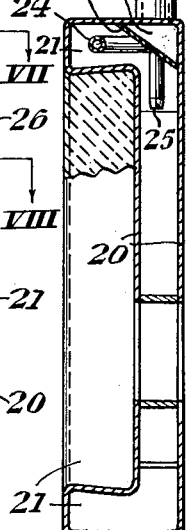
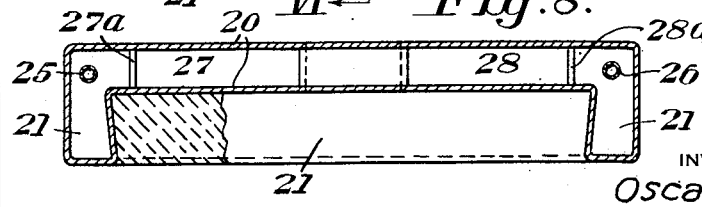

2,772,665
Patented Dec. 4, 1956

2,772,665

WATER COOLED FURNACE STRUCTURES

Oscar M. Fox, Pittsburgh, Pa., assignor, by mesne assignments, to Blaw-Knox Company, Pittsburgh, Pa., a corporation of Delaware Application March 19, 1949, Serial No. 82,463

9 Claims. (Cl. 122—498)

My invention relates primarily to water cooled furnace structures and the like and more particularly to hollow water cooled furnace parts having a hollow marginal portion subject to relatively intense heat, such as the offset portion of a combined water cooled doorframe and skew-back channel cooler.

The purpose of water cooling furnace parts is, of course, to limit the temperatures of such parts to a relatively low value at which their structural properties are not impaired and at which they are not rapidly consumed by oxidation and erosion. In water cooled furnace structures it is important that the unit heat transfer coefficient from the metal of the structure to the cooling water be high or, in other words, that the temperature differential at the metal-liquid interface be low. When the unit heat transfer coefficient from metal to water is low the temperature differential at the metal-water interface rises substantially (the total heat transfer being substantially the same). The effect of this condition is to produce high metal temperatures which cause rapid oxidation of the metal on the furnace side and scale deposits and corrosion on the water side thereby greatly reducing the life of the structure. The presence of scale, steam bubbles and other adverse surface conditions on the inner metal surface render the unit heat transfer coefficient even lower and the condition increasingly aggravated.

In furnace structures having a marginal section subject to relatively intense heat such as a combined water cooled doorframe and skew-back channel cooler, it is especially difficult to control the temperature of the metal in the hollow offset portion or ledge by the usual known means of cooling water circulation. The horizontal ledge is exposed to the most intense furnace radiation and is usually the first part to fail. Prior suggestions have included passing the cooling water in series through the ledge and frame, and reducing the sectional area in the ledge for water flow, both to give more effective water velocities in the ledge. With the limited volumes to supply water available and practicable sectional areas of the water passages, however, these suggestions do not provide water velocities of high enough order to keep the metal temperature down, and early ledge failure has been deemed a necessary evil where skew-back channel coolers or like coolers exposed to furnace radiation are used.

It is the object of my invention to improve the heat transfer coefficient from metal to water in water cooled furnace parts exposed to direct radiation by establishing a substantial velocity of water against the metal without increasing the total amount of water supplied to the member from an external source. My invention is particularly intended for application to marginal sections such as shallow horizontal ledges or members in which circulation by convection cannot effectively be applied. It may, however, be used to improve the cooling of metal parts of any water cooled furnace structure including vertical members for which the convection system of circulation has application, but has limitations.

I have solved this problem of circulation by jetting the water supply into the structure in such a way as to induce additional circulation of water along the marginal section from a reservoir in the main body of the structure. The energy of this jet of water establishes a substantial circulation of additional water from the main reservoir along the marginal section. At water supply pressures commonly available, it is practical by this method to induce a flow of water along the marginal section of from three to five times the quantity of water in the jet stream. This results in correspondingly higher water velocities along the marginal section, greatly exceeding those of prior practice, and correspondingly high heat transfer coefficients from metal to water which effectively cools the metal even where the total heat transfer rate is extremely high. Preferably the jet stream is introduced into the marginal section through oppositely directed nozzles located near the center of said section and directed toward the ends.

In the accompanying drawings illustrating a presently preferred embodiment of my invention Figure 1 is a front elevation of a water cooled doorframe and skew-back channel cooler;

Figure 2 is a top plan view of the same structure;

Figure 3 is a sectional view of the water cooled doorframe and skew-back channel cooler on the line III—III of Figure 1;

Figure 4 is a sectional view of the water cooled doorframe and skew-back channel cooler on the line IV—IV of Figure 1;

Figure 5 is a rear elevation of a water cooled furnace door;

Figure 6 is a section of the water cooled furnace door on the line VI—VI of Figure 5;

Figure 7 is a sectional view of the water cooled door on the line VII—VII of Figure 5;

Figure 8 is a sectional view of the water cooled door on the line VIII—VIII of Figure 5;

Figure 9 is a front elevation of a furnace arch chill incorporating my invention; and Figure 10 is a section on the line X—X of Figure 9;

Figure 11 is a sectional view of a water cooled doorframe and skew-back channel cooler showing a modified form of jetting action.

Referring to Figure 1, I have illustrated a water cooled doorframe and skew-back channel cooler comprising a body portion 1 with downwardly extending legs 1a forming the sides of the frame and a hollow offset marginal or ledge portion 2 separated from the body portion by dividing means in the form of partitions 3. The partitions 3 have an opening 4 at their ends adjacent the center of the ledge and openings 5 adjacent each remaining outer end. This opening 4 provides communication between the body portion 1 and the ledge 2. A wedge shaped conduit 6 enters the ledge 2 through the center opening 4 in the wall between the body and the ledge. Jet nozzles 7 extend from the wedge shaped conduit 6 in a direction parallel to the partition 3 and directed towards the ends of the ledge 2. An inlet connection 8 is provided at one side of the body portion 1 and is connected to the wedge shaped conduit 6 by a pipe 9 which passes through the interior of the doorframe. Horizontal baffle plates 10 extend into the interior of the body portion 1 below each of the openings 5 in the partition 3. An outlet opening 11 is provided at the top of the body of the doorframe on the side opposite to the inlet 8.

Cooling water enters the doorframe through the inlet 8 and passes through pipe 9 into the wedge shaped conduit 6 to the jet nozzles 7. Reduced orifices of the jet nozzles cause the water to stream towards the ends of the ledge with considerable velocity. A flow of water is thereby induced from the reservoir in body 1 through the opening 4 in the partition 3 between the ledge and body portion. This flow of water is several times larger in quantity than the discharge of water through the nozzles and it passes along the ledge with substantial velocity. Both the jet stream and the induced water pass out of the ledge and into the body through the openings 5 at either end of the partition 3 between the ledge and body portion. Water circulation in the legs 1a of the frame takes place by convection as heretofore mentioned, the hot water rising on the inside faces and cooler water descending on the outside faces. The horizontal baffle plates 10 below the openings 5 are intended to preserve and direct the circulation of water in the legs 1a by guiding the rising warm water towards the center opening 4 in the partition 3. The action of the opposed jets drawing circulating water into the ledge through the central opening 4 and returning water through the openings 5 sets up vigorous circulation in the body portion horizontally over the arch of the opening, as well as in the ledge, and greatly improves water circulation throughout the frame. Water which has been circulated through the frame finally leaves through the outlet 11.

It is obvious that the same action can be obtained by placing the jetting nozzles in the main body adjacent the openings between the ledge and the body. In such an arrangement the water is drawn from the ledge by the jetting action of the water in the main body with resultant circulation in the ledge (see Figure 11).

In Figure 5 I have illustrated a water cooled furnace door such as would be used with the aforementioned frame and to which my invention has been applied. The door comprises body portion 20 and a marginal section or hollow offset portion or frame 21 surrounding the four sides and extending inwardly toward the furnace. A water manifold 22 extends along the upper edge of the body of the door from one side to a point adjacent the other side. The manifold is formed by a plate 23 welded diagonally from top to front side of the frame and is closed by an end plate 23a. A T-shaped nozzle 24 projects inwardly into the upper flange 21 from the manifold 22. Downwardly extending nozzles 25 and 26 project into the body of the door at each end of the manifold. Baffle plates 27 and 28 extend parallel to the two sides and the bottom to induce water circulation down the sides and towards the center of the bottom. An inlet opening 29 is provided on one side of the door and communicates with the manifold 22. An outlet opening 30 is provided on the side of the door opposite the inlet 29.

Water introduced into the door through the inlet 29 enters the manifold 22 from which it is introduced into the body 20 of the door as jet streams from the nozzles 25 and 26 and into the flange 21 through the T-nozzle 24. The water which is introduced into the body through the nozzles 25 and 26 is directed along the side walls by the baffles 27 and 28. Water is induced to flow from the center portion of the body by the action of this stream as it flows past the ends 27a and 28a of the two baffles. The stream so induced is substantially larger than the stream of water entering through the two nozzles and flows along the side walls with considerable velocity. The water which is introduced into the flange 21 through the T-nozzle 24 is directed in two streams, one toward each end of the flange. A stream of water is also induced to flow from the body portion of the door into the flange by these jet streams. The induced water is brought up from the main body of the door and flows with the two jet streams in the direction of the ends of the flange.

Figure 9 shows a water cooled furnace arch chill incorporating my invention. The arch comprises a body portion 39 having an inlet pipe 30 and an outlet pipe 31 extending longitudinally of the interior of the body portion 39 substantially parallel to each other and to the top of the arch. Nozzle pipes 32 extend downwardly at intervals along the length of the inlet pipe 30 and are curved so that thin nozzles 32a are parallel to the bottom of the arch body 39 and directed from the center of the body toward the ends. Baffle plates 33 begin adjacent each nozzle and extend longitudinally of the arch parallel to the bottom of the arch body and in the direction in which the nozzle 32a is directed thereby separating the marginal section formed by the bottom and lower sides of the arch from the main body portion of the arch. Openings 34 are provided in the outlet pipe 31 adjacent the highest point of the arch body so as to receive the heated water rising from the arch bottom and carry it out of the arch body.

Water enters into the arch through the inlet pipe 30 from which it is introduced into the arch body 39 through the jetting nozzles 32a. The stream of water from the jetting nozzles 32a is directed away from the center of the arch and between the baffle plates 33 and the bottom of the arch. The flow of water from the jetting nozzles into the baffles induces a flow of water from the body portion along the bottom of the arch between the baffles and the bottom. This induced stream is substantially larger than the stream entering through the nozzle and flows with considerable velocity. As the water becomes heated it rises and flows through the openings 34 into the outlet pipe 31 from whence it leaves the arch.

It has been found in using water cooled structures according to my invention that the total temperature rise in the water between the inlet and the outlet is not noticeably different than when not using my structure. The inlet and outlet water temperatures are at all times in accord with ordinary practice, hence, the reservoir of water in the frame is at a temperature effective as a protecting coolant. It is clear that the problem of avoiding local overheating at zones where the rate of heat absorption from the furnace is high is not the supply of water but is rather the problem of insuring a high heat transfer coefficient at such zones permitting and establishing a low differential of temperature at the metal-liquid interface and consequently a low metal temperature. By introducing water in the form of a jet stream into such zones it is possible to insure a high heat transfer coefficient due to the quantity and velocity of water which is induced to flow along with the jet stream. The velocity of the water flowing along the metal-liquid interface is such that steam bubbles, scale and other adverse surface conditions caused by local overheating are avoided and the life of the water cooled structure is greatly extended.

Although I have shown a preferred embodiment of my invention it is to be understood that my invention is not limited to the construction shown in the drawings and described above but may be otherwise embodied within the scope of the following claims.

I claim:

1. A hollow water cooled frame and skew-back cooler having inlet and outlet openings, comprising a body portion forming the top of the frame, legs forming the sides of the frame, a hollow horizontal offset portion separated from the main body of the frame by a wall and projecting into a furnace chamber beneath a furnace skew-back channel thus forming a ledge portion, the wall having an opening intermediate its ends and openings at each end, a water manifold having oppositely projecting nozzles protruding into the ledge portion through the intermediate wall opening, said nozzles introducing water at a pressure differential with respect to the water in the frame, said nozzles and intermediate wall openings being spaced relative to one another to create an aspirator action whereby water is caused to flow from one side of the wall to the other through the openings in the wall, a pipe connecting said manifold with the inlet opening and outlet means for carrying water out of the structure.

2. A hollow water cooled frame and skew-back channel cooler, comprising a body portion forming the top of the frame, legs forming the sides of the frame, a hollow horizontal offset portion separated from the main body of the frame by a wall and adapted to project into the furnace chamber beneath the skew-back channel thus forming a ledge portion, the wall having an opening intermediate its ends and openings at each end, a water manifold protruding into the ledge through the intermediate wall opening, oppositely projecting nozzles on said manifold directed toward the ends of the ledge introducing water into the structure at a pressure differential with respect to the water therein, said nozzles and intermediate wall openings being spaced relative to one another to create an aspirator action whereby water is caused to flow from one side of the wall to the other through the wall opening, a pipe connecting the manifold with the inlet opening baffle means between the legs and the end openings of the wall and an outlet means for carrying water out of the frame.

3. A hollow water cooled furnace part having inlet and outlet openings, comprising a body portion, a hollow offset margin portion, a water manifold connected with the inlet opening, oppositely projecting nozzles on said manifold introducing water into the offset portion at a pressure differential with respect to the water in the body portion, partitions in the body portion directing the flow of water, said partitions and nozzles being spaced relative to one another to create an aspiratory action whereby the water is caused to flow between the body portion and the marginal portion and outlet means for carrying water out of the part.

4. A hollow water cooled furnace door frame and skew-back channel cooler having an inlet and an outlet opening comprising a body portion forming the top of the frame, legs forming the sides of the frame, a hollow horizontal marginal offset adapted to project into the furnace chamber beneath the skew-back channel, the body portion and offset being separated by a partition, jet means disposed centrally of the offset and adapted to introduce water into the offset at a pressure differential with respect to the water in the structure in the direction of the ends of the offset, said partition having an inlet opening therein between the offset and the body adjacent the jet means and outlet openings at each end thereof, said inlet opening and jet means being spaced relative to one another to create an aspiratory action whereby water is caused to flow between the body portion and the offset portion.

5. In a hollow water cooled furnace door frame and skew-back channel cooler having a body portion forming the top of the frame, legs forming the sides of the frame, a hollow horizontal marginal offset adapted to project into the furnace chamber beneath the skew-back channel the improvement comprising partition means generally separating the body portion and offset, T-shaped jet means disposed centrally of the interior of the offset and adapted to direct water under pressure toward the ends of said offset, said partition means having an opening therein between the offset and body adjacent the jet means and outlet openings at each end of the offset, said opening and jet means being spaced relative to one another so as to creat an aspiratory action whereby water is caused to flow from one side of the wall to the other.

6. A hollow water cooled door comprising a body portion, a hollow offset portion along each side of the door, a water manifold extending along one side of the body portion, oppositely projecting nozzles on said manifold introducing water into the offset portion and nozzles at either end of the manifold directed along the sides of the body, partition means beginning adjacent the nozzles at either end of the manifold and generally separating the offset portion and the body portion, said nozzles introducing the water at a pressure differential with respect to the water in the door whereby water is caused to flow between the body portion and the offset portion.

7. A hollow water cooled door having inlet and outlet openings, comprising a body portion, a hollow offset portion along each side of the door, a water manifold connected with the inlet openings, oppositely projecting T-shaped jet nozzles on said manifold directed along the offset portion and inlet jet nozzles cooperating with the manifold to introduce water into the body portion, partition means beginning adjacent the nozzles at either end of the manifold and generally separating the offset portion and the body portion, said jet nozzles introducing water at a pressure differential with respect to the water in the door whereby water is induced to flow between the body portion and the offset portion.

8. A hollow water cooled door comprising a body portion, a hollow offset portion along each side of the door communicating with the body portion, a water manifold extending along one side of the body portion, oppositely projecting jet nozzles on said manifold extending into the ledge, jet nozzles at either end of the manifold directed along the sides of the body, and partition means in the main body parallel to each side, said partition means and jet nozzles being spaced relative to one another to create an aspiratory action whereby water is caused to flow between the body portion and the offset portion.

9. A hollow water cooled arch chill comprising a body portion, a generally horizontal marginal section subject to relatively intense heat from the furnace, generally horizontal partition means separating the marginal section from the body portion, inlet means introducing water at a pressure differential with respect to the water in the arch and in the form of a jet directed between the partition means and the marginal section, said partition means and inlet means being spaced relative to one another to create an aspiratory action whereby water is caused to flow between the marginal section into the body portion.

References Cited in the file of this patent

UNITED STATES PATENTS

| | | |
|---|---|---|
| 690,891 | Morgan | Jan. 14, 1902 |
| 797,329 | Scherrer | Aug. 15, 1905 |
| 1,038,154 | Knox | Sept. 10, 1912 |
| 1,057,566 | Marsh et al. | Apr. 1, 1913 |
| 1,197,068 | Schmidt | Sept. 5, 1916 |
| 1,251,787 | Knox | Jan. 1, 1918 |
| 1,282,861 | Knox et al. | Oct. 29, 1918 |
| 1,282,865 | Knox | Oct. 29, 1918 |
| 1,421,596 | Smith | July 4, 1922 |
| 1,580,187 | Williams | Apr. 12, 1926 |
| 1,648,157 | Williams | Nov. 8, 1927 |
| 1,690,606 | Williams | Nov. 6, 1928 |
| 1,690,619 | Christy | Nov. 6, 1928 |
| 1,729,750 | Sheldon | Oct. 1, 1929 |
| 1,836,784 | Williams | Dec. 15, 1931 |
| 1,864,762 | Robinson | June 28, 1932 |
| 1,915,398 | Bedell et al. | June 27, 1933 |
| 1,946,295 | Schade | Feb. 6, 1934 |
| 1,984,608 | Waldrop et al. | Dec. 18, 1934 |
| 2,107,185 | McAfoos | Feb. 1, 1938 |
| 2,151,441 | Reardon | Mar. 21, 1939 |
| 2,246,402 | McDonnell | June 17, 1941 |
| 2,278,619 | Leo | Apr. 7, 1942 |
| 2,306,966 | Leo | Dec. 29, 1942 |
| 2,477,161 | Ausland et al. | July 26, 1949 |
| 2,485,689 | Baumann | Oct. 25, 1949 |